United States Patent [19]
McGowan et al.

[11] 3,777,648
[45] Dec. 11, 1973

[54] MOTOR VEHICLE VENTILATING SYSTEM
[75] Inventors: Joseph McGowan, Preston; Gerald Fowler, Eccleston near Chorley, both of England
[73] Assignee: British Leyland Truck and Bus Division Limited, Lancashire, England
[22] Filed: July 12, 1971
[21] Appl. No.: 161,849

[30] Foreign Application Priority Data
Nov. 7, 1970 Great Britain.................. 33,765/70

[52] U.S. Cl..................... 98/2.04, 98/2.09, 98/2.15, 98/14
[51] Int. Cl.............................................. B60h 1/24
[58] Field of Search...................... 98/4, 8, 10, 13, 98/14, 2.04, 2.09, 2.1, 2.14, 2.15

[56] References Cited
UNITED STATES PATENTS

| | | | |
|---|---|---|---|
| 2,065,445 | 12/1936 | Galson | 98/8 |
| 2,154,801 | 4/1939 | Anderson | 98/4 |
| 2,204,114 | 6/1940 | Anderson | 98/10 |
| 2,673,512 | 3/1954 | Henney | 98/10 |
| 2,719,475 | 10/1955 | Royall | 98/2.15 |
| 2,775,186 | 12/1956 | Strobell | 98/14 |

Primary Examiner—Meyer Perlin
Attorney—Harold T. Stowell et al.

[57] ABSTRACT

A heating/ventilating system of a public service vehicle includes a plenum chamber formed in the vehicle's roof to which air is supplied by a heating/ventilating unit, the windows of the vehicle being demisted or defrosted by air escaping from the plenum chamber through outlets adjacent the tops of the windows.

4 Claims, 6 Drawing Figures

3,777,648

MOTOR VEHICLE VENTILATING SYSTEM

The present invention relates to motor vehicles and more particularly to the heating and ventilating systems used in public service vehicles such as buses.

According to the present invention a motor vehicle body has a passenger saloon which is supplied with air by a heating/ventilating system having the following combination of features:

a. the vehicle roof is hollow and forms a plenum chamber which can be supplied with air from a heating/ventilating unit; and b. the plenum chamber has outlets along its sides through which air in the plenum chamber can escape and be directed down the insides of the side windows of the passenger saloon.

According to a first feature of the invention the heating/ventilating unit is mounted on the vehicle roof at its rear end.

According to a second feature of the invention the plenum chamber has flow impedance members located at intervals along its length in order to create sub-compartments of the plenum chamber so that in use discrete pressure heads are generated in each sub-compartment, each outlet being in communication with a sub-compartment so that the pressure head in that sub-compartment causes air to flow from that sub-compartment through the said outlets.

According to a third feature of the invention each of the outlets has associated with it an arrangement adapted to provide a substantially constant pressure head at the outlet when the heating/ventilating unit is supplying air to the plenum chamber.

According to a fourth feature of the invention the said arrangement comprises a perforated plate which separates one of the sub-compartments from its associated outlet so that the effect of pressure variations within the sub-compartment on the air flow downstream of the perforated plate is minimised.

According to a fifth feature of the invention the said arrangement comprises a plurality of baffles which separate one of the sub-compartments from its associated outlet so that the effect of pressure variations within the sub-compartment on the air flow downstream of the plurality of baffles is minimized.

According to a sixth feature of the invention the flow impedance members comprise a plurality of roofsticks which extend transversely of the plenum chamber, each of the roofsticks having a plurality of orifices in it so that air from the heating/ventilating unit can flow longitudinally through the plenum chamber, by way of the orifices.

How the invention may be carried out will now be described, by way of example only, and with reference to the accompanying drawings in which.

Figure 1:
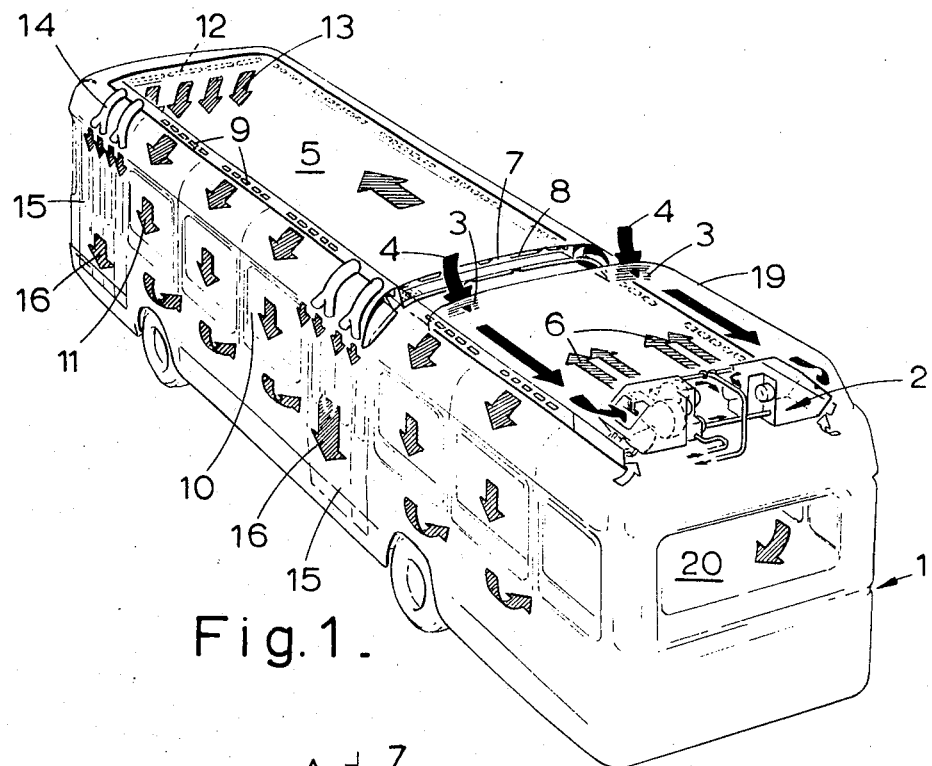
FIG. 1 is a diagrammatic perspective view of a bus showing the air flow produced by a heating/ventilating system according to the present invention.
Figure 2:
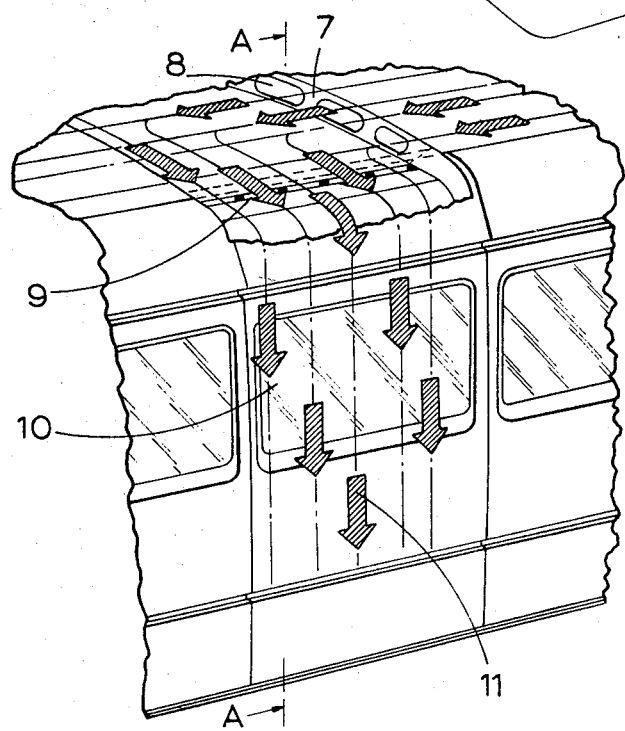
FIG. 2 is a fragmentary view of part of the bus shown in FIG. 1.
Figure 3:
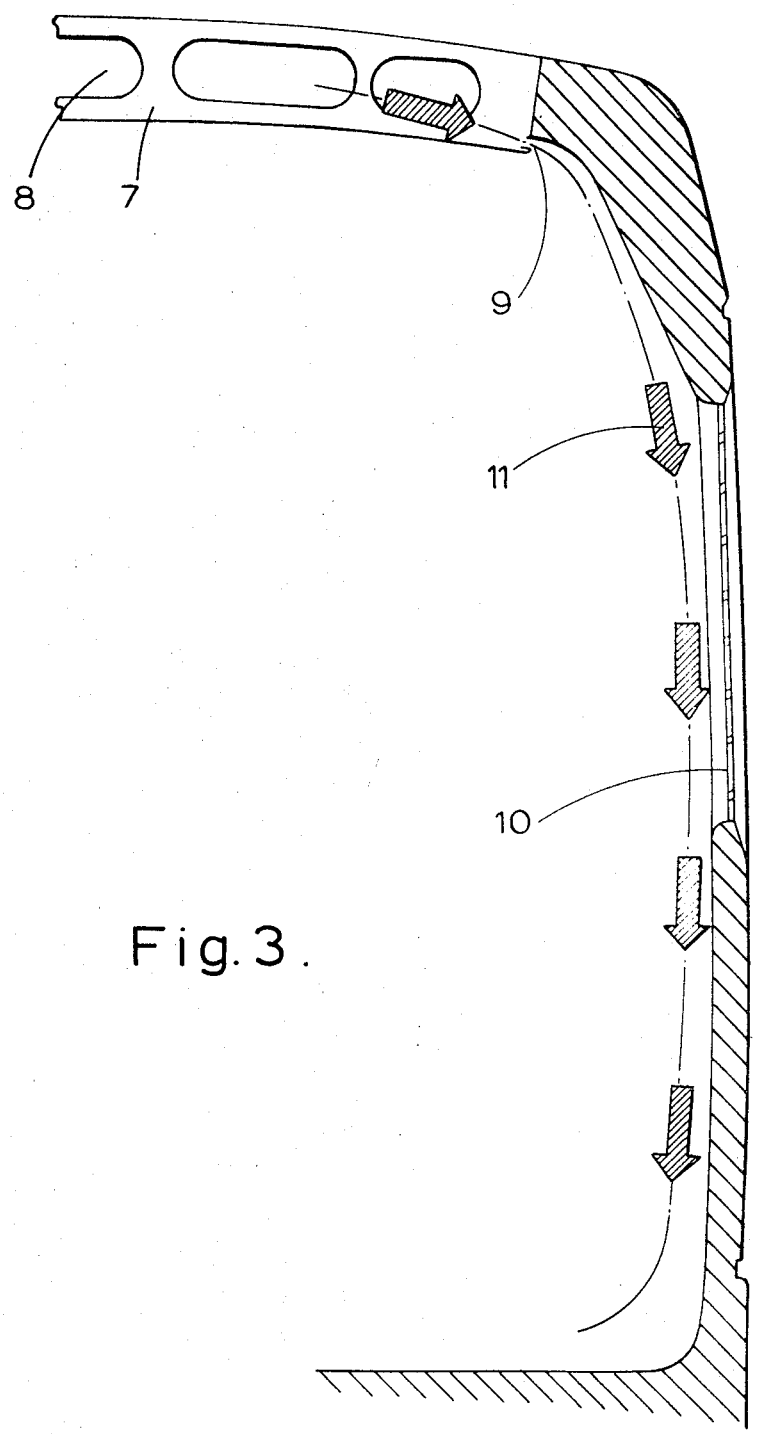
FIG. 3 is a cross sectional view taken on the line A—A of FIG. 2.

A public service vehicle, in this case a single decker bus, 1 is provided with a heating/ventilating unit 2 located in a casing or "pod" 19 mounted on its roof at the rear end of the vehicle. The roof of the vehicle is hollow to thus form a plenum chamber 5 into which air can be blown by the heating/ventilating unit 2.

Air enters the "pod" 19 through inlets 3, as indicated by the arrows 4, passes into the heating/ventilating unit 2, and is then expelled into the plenum chamber 5, as indicated by the arrows 6.

The plenum chamber 5 is sub-divided transversely by a plurality of roofsticks 7 each of which has orifices 8 formed in it to allow air to pass the length of the plenum chamber 5.

Outlets 9 are formed along the sides of the plenum chamber 5 to allow air from the latter to be directed into the passenger saloon 20 of the bus and down the insides of its side windows 10 in order to demist or defrost them, as indicated by the arrows 11.

Further outlets 12 are located at the front of the plenum chamber 5 to enable air to pass from the plenum chamber down the inside of the windscreen of the bus in order to demist or defrost it, as indicated by arrows 13.

Further outlets 14 are provided by which air can be directed downwardly across the doorways 15 of the bus, when the doors are open, as indicated by the arrows 16, in order to form an air curtain which tends to prevent loss of heat from the passenger saloon.

If the plenum chamber 5 consisted of a simple passage extending from the heating/ventilating unit 2 to the front of the bus then because the pressure drop from the rear end to the front end of the plenum chamber would not be substantial, there would be a tendency for the bulk of the air to be emitted from the outlets 12 and very little to be emitted from the side outlets 9. This would be because the air would have a relatively high velocity and suffer very little pressure drop in travelling from one end of the plenum chamber to the other.

The present invention is concerned with providing a simple arrangement by which even distribution of the air in the plenum chamber 5 is achieved without recourse to complicated structural arrangements within the plenum chamber itself to deflect the air into the desired locations.

The roofsticks 7 of the vehicle have orifices 8 and have been designed so that they act as flow impedance members for air flowing from the heating/ventilating unit 2. The effect of the roofsticks 7 is to sub-divide the plenum chamber 5 into a series of sub-compartments in each of which the air pressure has a minimum value at its upstream end and a maximum value at its downstream end. Of course, notwithstanding this fact there is an over all downward pressure gradient from the rear of the plenum chamber 5 to the front.

Thus, when the heating/ventilating unit is blowing air into the plenum chamber 5 there are pressure heads existing in each of the sub-compartments formed between adjacent roofsticks 7 and these pressure heads are employed to supply air to the side outlets 9.

In order to further regulate the supply of air to the outlets 9 a throttling device is provided in association with each outlet 9. In the embodiment shown this device takes the form of a perforated or foraminous plate 17 which is in fact formed as a unit with a box 18 having the outlet 9 formed in it.

Figure 4:
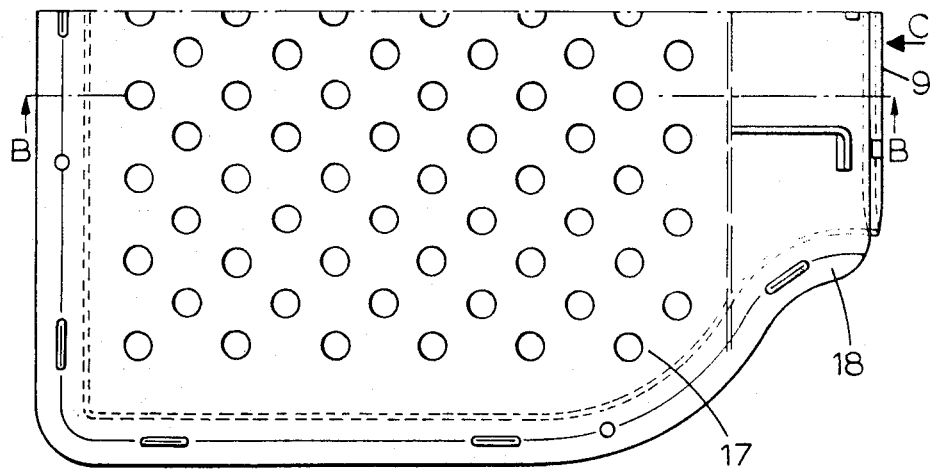
FIG. 4 is a half-plan view of a throttle device for use in the heating/ventilating system shown in the previous Figures, the other half of the device (not shown) being a mirror image of that shown.
Figure 5:
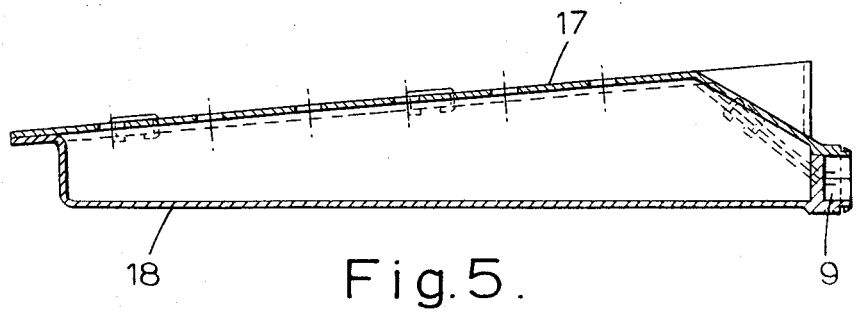
FIG. 5 is a section taken on the line B—B of FIG. 4.
Figure 6:
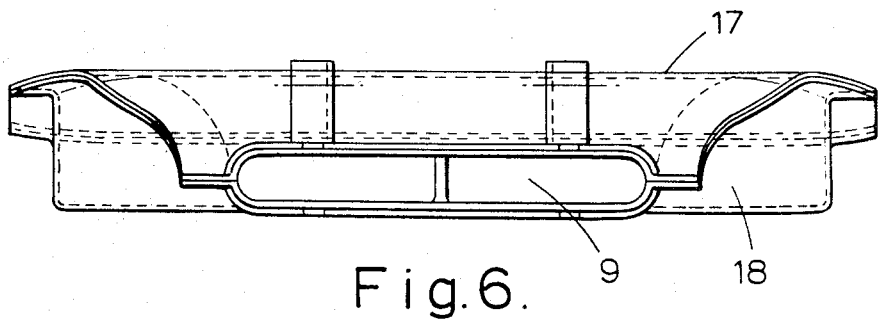
FIG. 6 is a full end view of the device shown in FIG. 4 and taken in the direction of the arrow C.

In other words, since the outlet of the box 18 actually forms the outlet 9, as shown in FIGS. 4 and 5 for example, the box 18 will extend in a direction transversely of the vehicle with the outlet 9 nearest to the side of the vehicle body. Thus air will pass into the box 18 through the holes 17 and thence in a substantially transverse direction out of the box through the outlet 9.

The purpose of the perforated plate 17 is to even out pressure variations which occur in the sub-compartments between adjacent roofsticks 7 and thus ensure, as far as possible, that the pressure within the box 18 is substantially constant so that the flow of air through the outlets 9 will in turn be substantially constant.

The size, number and distribution of the holes in the plate 17 are tailored to the position of the particular outlet 9 along the length of the plenum chamber 5.

A possible alternative construction for the throttling device involves replacing the perforated plate 17 by a plurality of mutually spaced apart baffles which extend in a direction transverse to the plenum chamber. Although two specific examples of throttling device have been described other arrangements can be used to produce the same result.

We claim:

1. A passenger vehicle body including,
   a. A vehicle body having a hollow roof, said roof having an elongated plenum chamber;
   b. a heating/ventilating unit connected to the plenum chamber to feed air into one end of said chamber;
   c. structural members in the form of apertured panels extending transversely across the plenum chamber normal to the longitudinal axis thereof and spaced apart with respect to one another longitudinally of the plenum chamber to sub-divide the plenum chamber into a plurality of sub-compartments;
   d. at least one window on each side of said vehicle body;
   e. each said sub-compartment having a plurality of outlets which are aligned in two lines parallel to the longitudinal axis of the plenum chamber and vehicle body, one line being adjacent and laterally aligned with the top of a window on one side of the vehicle body and the other line being adjacent and laterally aligned with the top of another window on the opposite side of the vehicle body.

2. The passenger vehicle body of claim 1 including:
   f. a plurality of throttling devices being coupled with the said plurality of outlets, each throttling device comprising a box having an inlet and an outlet, said box outlet being coextensive with said sub-compartment outlet, said inlet being upstream of said outlet, said inlet being defined by means for impeding the flow of air into said box to even out variations of air pressure in said box and thus promote a constant air flow through said outlet.

3. A passenger vehicle body as claimed in claim 2 in which said flow impedance means comprises a perforated plate which defines one wall of said box.

4. A passenger vehicle body as claimed in claim 2 in which each said flow impedance means comprises a plurality of mutually spaced apart baffles on said box and which extend in a direction transverse of the plenum chamber.

* * * * *